United States Patent
Marquardt

Patent Number: 5,474,313
Date of Patent: Dec. 12, 1995

[54] HANDFORK

[76] Inventor: Curtis L. Marquardt, 7810 SE. Hood Ct., Milwaukie, Oreg. 97267

[21] Appl. No.: 262,258

[22] Filed: Jun. 20, 1994

[51] Int. Cl.⁶ .................................................. B62B 1/12
[52] U.S. Cl. .................................... 280/47.28; 280/47.29
[58] Field of Search ............................... 414/444, 490; 280/47.28, 47.24, 47.27, 47.29, 47.17

[56] References Cited

U.S. PATENT DOCUMENTS

| | | | |
|---|---|---|---|
| 653,826 | 7/1900 | Soule et al. | 280/47.28 |
| 2,744,762 | 5/1956 | Kirk | 280/47.28 |
| 4,185,853 | 1/1980 | Thurmond, Jr. | 280/47.28 X |
| 4,756,540 | 7/1988 | Crawford | 280/47.28 X |
| 4,921,270 | 5/1990 | Schoberg | 280/47.28 X |

*Primary Examiner*—Margaret A. Focarino
*Assistant Examiner*—Michael Mar
*Attorney, Agent, or Firm*—Robert L. Harrington

[57] ABSTRACT

An L-shaped extender for a hand truck including a support brace and an extension member extending transversely therefrom, the L-shaped extender provided with a pivotal connection for connecting the vertical support brace to the axle of a hand truck. The extender is configured to position the extension member to a folded position behind the side supporting surface of the hand truck and alternatively to a carrying position with the extension member supported on the blade of the hand truck. The extension member is tapered to a thin forward edge for maneuvering the forward edge of the extender under a load.

1 Claim, 1 Drawing Sheet

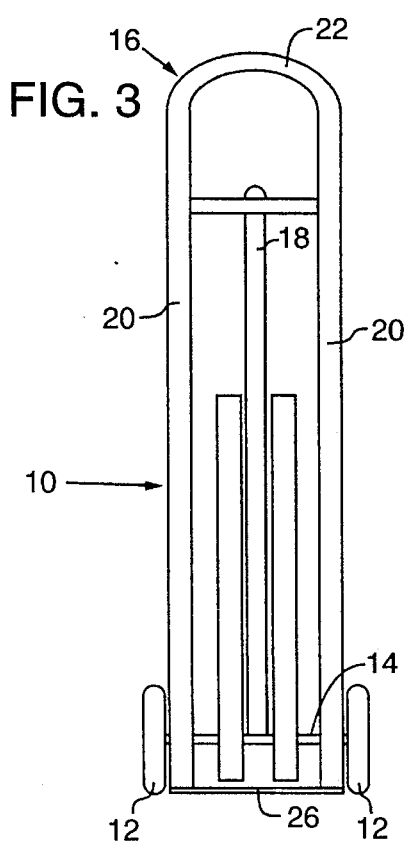
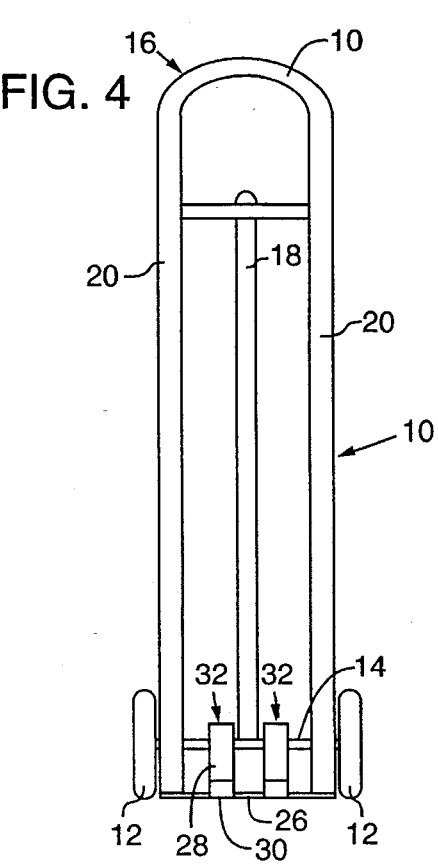

HANDFORK

FIELD OF THE INVENTION

This invention relates to lift extenders removably attachable to conventional hand trucks and more particularly to a configuration and attachment that does not require disassembly of the hand truck for mounting of the extenders.

BACKGROUND OF THE INVENTION

Hand trucks are normally used for load objects having a relatively short lateral dimension whereby the blade of the hand truck can be slid under the item and tipped back so that the center of gravity is positioned over the wheels or at least over the blade so that the load object will stay on the hand truck. On occasion the hand truck will be used for carrying more bulky items, e.g., pallets. A short load or even no load carried on the pallet places the center of gravity, even with the load tipped back, forward of the blade and the load will simply tip off the end of the blade.

BRIEF SUMMARY OF THE INVENTION

In accordance with the present invention, when a hand truck is to be used for transporting bulky items, the hand truck is fitted with L-shaped extenders having a vertical brace and a lateral extension member. The vertical brace which may include a keyway, fits onto the axle of the hand truck and readily mounts the extenders to the hand truck. The lateral extension members project forwardly of the vertical brace and is supported at its rear end by the blade of the hand truck. The extension members are tapered back to front to form a thin front end tip with the tip extended along the plane of the blade whereby the tip of the extension members in the same manner as the blade, can be maneuvered under a load. The extenders are thereby projected past the center of gravity of the load objects for convenient transporting.

The invention is primarily designed for "breaking back" or tipping objects (such as crates, pallets, engine and transmission cases, large computer boxes containing underlying slats, and the like) when center of gravity is farther forward than the length of the conventional hand truck blade.

BRIEF DESCRIPTION OF THE DRAWINGS

FIG. 1 is a side view illustrating a conventional hand truck with extenders of the present invention pivotally attached to the axle thereof and with the extenders pivoted to an upwardly folded position;

FIG. 2 is similar to FIG. 1 but showing the extenders pivoted to a position for lifting and transporting a bulky load object;

FIG. 3 is a front view of the hand truck and extenders as shown in FIG. 1; and

FIG. 4 is a front view of the hand truck and extenders as shown in FIG. 2.

DETAILED DESCRIPTION

With reference to the drawings, a typical hand truck 10 includes a pair of wheels 12 connected in spaced apart relation by an axle 14. A unified frame 16 includes a handle portion 18, an inverted U-shaped tube defining side braces 20 and a cross brace 22 that secures the handle portion 18 and side braces 20 together. The handle portion 18 is mounted to the axle 14 and reinforcing rods 24 (shown in FIGS. 3 and 4) from the side braces 20 to the axle 14 add rigidity. A blade 26 projects forwardly from the bottom end of the side braces 20.

Extenders 32 attachable to the hand truck are similar in construction and as illustrated, are pivotally fastened to exposed portions of the axle 14 on each side of the handle portion 18 and between the side braces 20 and wheels 12. A vertical support brace 28 is rigidly secured to a lateral extension member 30 to form the extenders 32. As seen in FIG. 4, the support brace 28 and extension member 30 form an L-shape. The extension member 30 is tapered from a thick rear end to a thin front end as particularly seen in FIG. 2. The extension member 30 in the carrying position of FIG. 2 extends substantially in the same plane as the hand truck blade 26 which is enabled by the L-shape configuration. As seen in FIG. 1, the extenders 32 are pivoted around the pivotal connection of the vertical support brace 28 with axle 14 to position the extension members 30 in a folded position substantially behind the supporting surfaces of side braces 20.

One form of the extender 32 was produced as follows: One piece of 2-inch square steel cut on the diagonal to form two forks. These "forks" are then fastened to two 4-inch blocks of 2-inch square steel with a keyway cut therein to facilitate sliding over and fastening with U-bolts on to the axle of any conventional hand truck. U-bolts may be solely used to attach forks to axles where no lateral side braces are present.

The preferred form of my invention is two small scaled down forks (roughly patterned after but not exactly proportionate to the forks found on any forklift), the basic function of which is to amplify the mechanical advantage of the simple machine commonly referred to as the hand truck. They are designed to fit on any hand truck and although the fork may be used to move a pallet of several hundred pounds, they are by no means intended for use with pallets alone.

The invention exploits a gap in the present day dock equipment between a pallet jack and a forklift in situations where a crate or pallet will not accept a pallet jack but the freight is not really heavy enough for a forklift. Another advantage is in situations where no other equipment is available to help "break the freight back" as is frequently the case in loading trucks and the like.

The invention as illustrated is capable of numerous modifications by those skilled in the art without departing from the scope of the invention as determined by the following claims.

I claim:

1. In combination, a conventional hand truck including wheels spaced apart and inter-connected by an axle, a unified frame mounted to the axle including a side load supporting portion having a side load supporting surface forward of said wheels, and a bottom load supporting blade having a planar upper surface, the blade extending forwardly from a lower end of said side load supporting surface substantially tangential to the bottom of the wheels and fixed secured thereto, and said unified frame extended upwardly from said blade and a handle at an upper position on said frame whereby the blade can be slid along a floor-like surface and under a load to place a side of the load against the side support surface, and by tilting the frame around the axle, lift and tilt the load for transporting of the load, the hand truck configuration as described having exposed axle portions for receiving a pair of lift extenders, each of said lift extenders comprising:

a support brace and a tapered elongated extension member having upper and lower planar surfaces and extending transversely to said support brace, said extension member having a thin forward end and a thick rearward end rigidly secured to one end of said support brace and forming an L-shape with said support brace, and a fastener pivotally fastening an opposite end of said support brace to an exposed axle portion of said hand truck to allow movement of the support brace to selected transverse positions along the length of the exposed axle portion and between the wheels thereof, said truck including structure for maintaining said pairs of lift extenders in a spaced apart relationship along the axle portion and said lift extender being movable between a folded position with the extension member projected upwardly behind said side load support surface of said hand truck frame and a carrying position with the support braces extending vertically and the extension member supported on said blade of said hand truck in a horizontal position and extending forwardly of said blade with the thin forward end of the extender maneuverable along said floor-like surface and under a load.

\* \* \* \* \*